P. J. FULLER.
Hop-Vine Support.
No. 79,648.
Patented July 7, 1868.
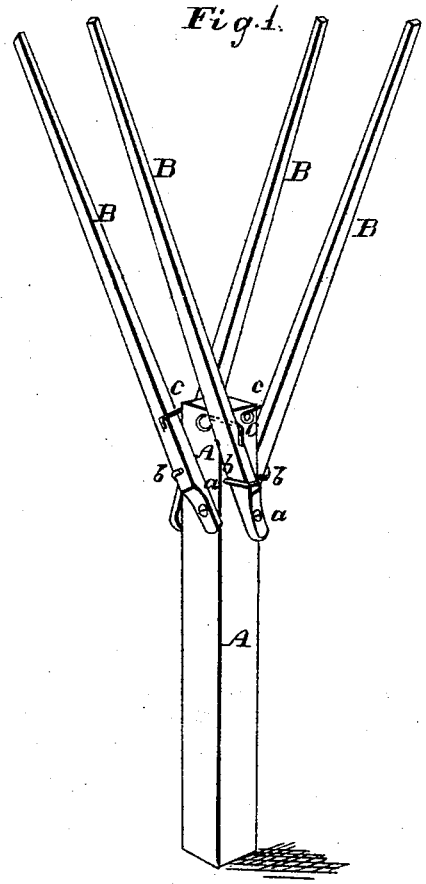
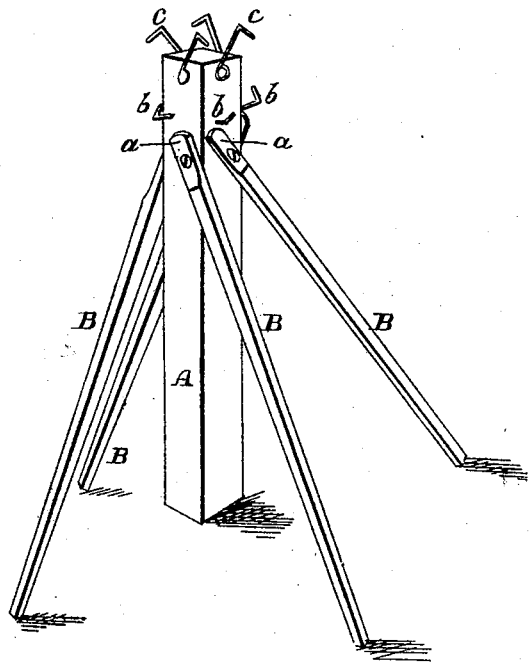
Witnesses.
Wm. A. Morgan.
G. C. Cotton.
Inventor.
P. J. Fuller.
per Munn & Co.
Attys.

United States Patent Office.

PETER J. FULLER, OF CLARKSVILLE, NEW YORK.

Letters Patent No. 79,648, dated July 7, 1868.

IMPROVEMENT IN HOP-VINE SUPPORT.

The Schedule referred to in these Letters Patent and making part of the same.

TO ALL WHOM IT MAY CONCERN:

Be it known that I, PETER J. FULLER, of Clarksville, in the county of Albany, and State of New York, have invented a new and improved Hop-Vine Support; and I do hereby declare that the following is a full, clear, and exact description thereof, which will enable others skilled in the art to make and use the same, reference being had to the accompanying drawings, forming a part of this specification, in which—

Figure 1 represents a side elevation of my improved hop-vine support, showing the arms extended.

Figure 2 is a side elevation of the same, showing the arms folded down.

Similar letters of reference indicate corresponding parts.

This invention relates to a new apparatus for training hops, and consists of a short pole, secured in the ground, and of a series of arms, pivoted to the upper part of the same. The arms can be brought to an upright position, and are then clamped by means of hooks or other equivalent devices, so as to form rigid supports for the growing hops. Four, or more or less, such hops being arranged on each pole, an equal number of vines can be trained on each pole. The arms are, by means of the aforesaid hooks, so firmly held that they need no further fastening or support. When the hops are to be removed, the arms are swung down, and the vines can then very easily be stripped off.

A, in the drawing, represents a post, of suitable size and description, secured in the ground in suitable manner. Its upper part should be polygonal, so that bars B B can be pivoted to each of its sides.

Four or any suitable number of such bars B B are thus, by means of pins $a$ $a$, pivoted to the sides of the post A. The bars B can be turned around their pivots, so as to project upward, but somewhat obliquely from the post A, as is clearly shown in fig. 1.

In this position they can be fastened by means of hooks $b$ and $c$, as shown. The hooks $b$ are firmly secured to and project from the post, and form a rest for the bars B to lean against.

The hooks $c$ are pivoted to the upper part of the post A, and are turned over the bars B, so as to prevent them from turning around their pivots. Instead of either the hooks $b$ or $c$, pins may be used, for, if one hook of sufficient strength is provided for each bar, it will prevent lateral play of the bar. Other fastening-devices may, however, be used with equal or approximating advantage.

When the hops are to be taken off, the arms are folded down, as in fig. 2, which can be easily done by swinging the upper hook, $c$, out of the way. The vines can then very conveniently be taken off without requiring the use of ladders.

By the use of this invention the training of hops will be greatly facilitated, the most important feature being that the arms can be swung down to facilitate the removal of the hops.

Having thus described my invention, I claim as new, and desire to secure by Letters Patent—

1. A hop-vine protector, consisting of the post A, and of the arms B, which are pivoted thereto, so that they can be swung up or down at will, substantially as herein shown and described.

2. The swinging arms B, when pivoted to a post, A, and when fastened in their upright position by means of hooks $b$ $c$, or their equivalents, substantially as herein shown and described.

The above specification of my invention signed by me, this 12th day of May, 1868.

PETER J. FULLER.

Witnesses:
ALEX. F. ROBERTS,
FRANK BLOCKLEY.